(12) United States Patent
Masuda et al.

(10) Patent No.: US 8,613,192 B2
(45) Date of Patent: Dec. 24, 2013

(54) EXHAUST GAS PURIFIER

(75) Inventors: Hiroshi Masuda, Osaka (JP); Michihiko Hara, Osaka (JP); Shuji Shiozaki, Osaka (JP); Hiroshi Matsuyama, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 332 days.

(21) Appl. No.: 12/736,472

(22) PCT Filed: Sep. 10, 2008

(86) PCT No.: PCT/JP2008/066296
§ 371 (c)(1),
(2), (4) Date: Dec. 10, 2010

(87) PCT Pub. No.: WO2009/133635
PCT Pub. Date: Nov. 5, 2009

(65) Prior Publication Data
US 2011/0120104 A1    May 26, 2011

(30) Foreign Application Priority Data
Apr. 28, 2008    (JP) ................. 2008-116983

(51) Int. Cl.
*F01N 3/00*    (2006.01)
*F01N 3/02*    (2006.01)
*F02D 41/00*    (2006.01)

(52) U.S. Cl.
USPC ................. 60/295; 60/311; 123/681

(58) Field of Classification Search
USPC .............. 60/295, 297, 311; 95/14, 15, 19, 20; 123/681
See application file for complete search history.

(56) References Cited

U.S. PATENT DOCUMENTS

2005/0155345 A1    7/2005   Nakamura
2006/0266017 A1*   11/2006  Kresse ........................ 60/274

FOREIGN PATENT DOCUMENTS

| JP | 2001-280121 | 10/2001 |
| JP | 2003-106137 | 4/2003 |
| JP | 2004-137968 | 5/2004 |
| JP | 2005-337062 | 12/2005 |
| JP | 2008-02519 | 1/2008 |

* cited by examiner

*Primary Examiner* — Kenneth Bomberg
*Assistant Examiner* — Audrey K Bradley
(74) *Attorney, Agent, or Firm* — Jordan and Hamburg LLP

(57) ABSTRACT

An engine exhaust gas purifier includes a filter, a hydraulic load mechanism, a clog detector and a forced actuation valve. The filter purifies the exhaust gas of the engine. The hydraulic load mechanism is driven by the engine's power. The clog detector detects a clogging state of the filter. The forced actuation valve forcibly increases an actuation amount of the hydraulic load mechanism. The filter is regenerated by increasing an engine load while maintaining an engine rotating speed, by increasing the actuation amount of the hydraulic load mechanism with an actuation of the forced actuation valve on the basis of detection information of the clog detector.

3 Claims, 11 Drawing Sheets

EXHAUST GAS PURIFIER

TECHNICAL FIELD

The present invention relates to an exhaust gas purifier for purifying an exhaust gas in an internal combustion engine such as a diesel engine.

BACKGROUND ART

Conventionally, there has been carried out a collection of a particulate matter (hereinafter, referred to as PM) in an exhaust gas by using a particulate filter (hereinafter, referred to as filter), for purifying the exhaust gas, in an internal combustion engine, particularly in a diesel engine. In this case, if the PM collected by the filter exceeds a predetermined amount, a distribution resistance within the filter is increased so as to cause a reduction of an engine output. Accordingly, there has been carried out a recovery of a PM collecting capacity of the filter (a regeneration of the filter) by removing the PM deposited on the filter.

As one example of this kind of regeneration system, there is a chemical reaction type regeneration system. The chemical reaction type regeneration system is structured such that the PM is oxidized and removed by oxidizing a nitrogen monoxide (NO) in the exhaust gas into an unstable nitrogen dioxide ($NO_2$) by an oxidation catalyst existing in an upstream side of a filter in an exhaust path of an engine, and using an oxygen (O) discharged at a time when $NO_2$ comes back to NO. It is possible to regenerate the filter during an engine drive by utilizing an oxidation action of the oxidation catalyst mentioned above.

In this case, in the chemical reaction type regeneration system, the chemical reaction is carried out only in the case where a temperature of the exhaust gas is equal to or higher than a regenerable temperature (for example, about 300° C.). In other words, if a state in which the exhaust gas temperature is lower than the regenerable temperature continues, the PM is deposited in a large quantity on the filter. As a result, the filter is clogged. Accordingly, it is necessary to make the exhaust gas temperature equal to or higher than the regenerable temperature in the case where the PM deposition amount reaches a predetermined amount.

In this regard, in patent document 1, there is disclosed a matter that an electrothermal type heater is provided in an upstream side of a filter with oxidation catalyst in an exhaust path of an engine, and an exhaust gas temperature conducted to the filter with oxidation catalyst is raised on the basis of a heater heating.

Patent Document 1: Japanese Unexamined Patent Publication No. 2001-280121

DISCLOSURE OF THE INVENTION

Problem to be Solved by the Invention

However, in the structure of the patent document 1, since a dedicated heater for raising the exhaust gas temperature is necessary, the parts number is increased, and there is a problem that a cost increase is caused. Further, since it is unavoidable that the exhaust gas is locally heated by the heater, and it is impossible to uniformly heat the exhaust gas, it is impossible to uniformly purify the exhaust gas. In addition, since the temperature of the filter with oxidation catalyst coming close to the heater becomes uneven, there is such a problem that a damage such as a crack or the like is generated in the filter with oxidation catalyst at a high probability.

Accordingly, a technical object of the present invention is to provide an exhaust gas purifier from which these problems are dissolved.

Means for Solving the Problem

In accordance with the first aspect of the invention, there is provided an exhaust gas purifier, comprising:
filter means for purifying an exhaust gas arranged in an exhaust path of an engine;
a hydraulic load mechanism driving on the basis of a power of the engine;
clogging detecting means capable of detecting a clogging state of the filter means; and
forced actuation valve means for forcibly increasing an actuation amount of the hydraulic load mechanism,
wherein the filter means is regenerated by increasing an engine load while maintaining an engine rotating speed, by increasing the actuation amount of the hydraulic load mechanism with an actuation of the forced actuation valve means on the basis of detection information of the clogging detecting means.

In accordance with the second aspect of the invention, there is provided an exhaust gas purifier as described in the first aspect, wherein the forced actuation valve means is constructed by a pressure control valve provided between an actuation portion hydraulic pump serving as the hydraulic load mechanism and an actuation portion hydraulic circuit existing in a downstream side of the actuation portion hydraulic pump, and the pressure control valve keeps a pressure flow rate in the actuation portion hydraulic circuit side constant, and is capable of increasing a pressure in the actuation portion hydraulic pump side.

In accordance with the third aspect of the invention, there is provided an exhaust gas purifier as described in the second aspect, wherein the pressure control valve actuates so as to increase the pressure of the actuation portion hydraulic pump side only at a predetermined pressure, in the case where an engine load is equal to or less than a previously set reference load value.

In accordance with the forth aspect of the invention, there is provided an exhaust gas purifier as described in the third aspect, wherein the pressure increase in the actuation portion hydraulic pump side by the pressure control valve is released, in the case where the engine load exceeds the reference load value.

Effect of the Invention

In accordance with the present invention, since the structure is provided with the filter means for purifying the exhaust gas arranged in the exhaust path of the engine, the hydraulic load mechanism driving on the basis of the power of the engine, the clogging detecting means capable of detecting the clogging state of the filter means, and the forced actuation valve means for forcibly increasing the actuation amount of the hydraulic load mechanism, and the filter means is regenerated by increasing the engine load while maintaining the engine rotating speed, by increasing the actuation amount of the hydraulic load mechanism with the actuation of the forced actuation valve means on the basis of the detection information of the clogging detecting means, it is possible to oxidize and remove the PM by forcibly raising the exhaust gas temperature, for example, even if the drive state of the engine at the current time point is a state in which the PM can neither be oxidized nor be removed, but is deposited on the filter means. Accordingly, there can be achieved such an effect that the PM collecting capacity of the filter means can be securely recovered regardless of the drive state of the engine (the state of the rotating speed and the load).

DESCRIPTION OF REFERENCE NUMERALS

Figure 1:
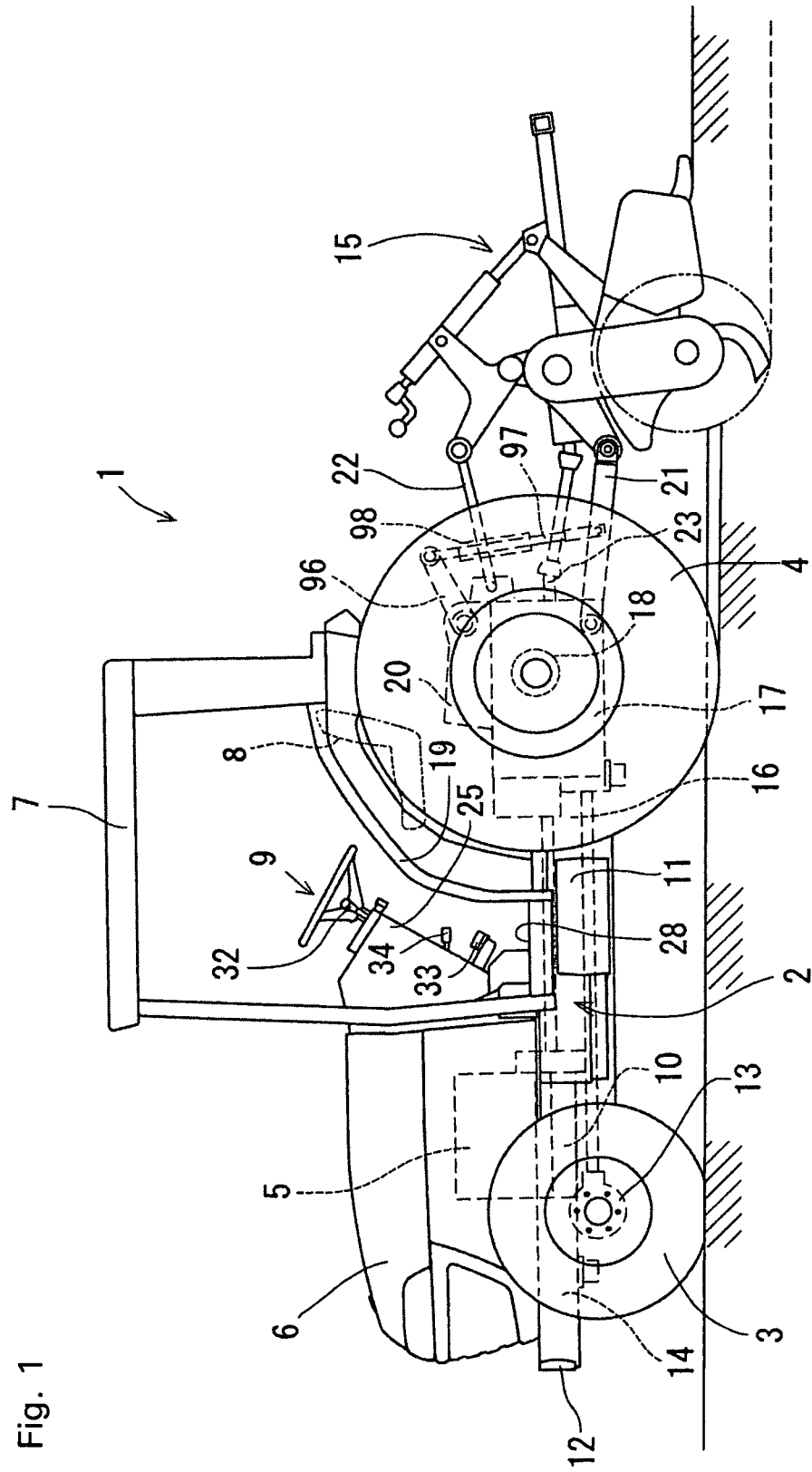
FIG. 1 is a side elevational view of a tractor in accordance with a first embodiment.

5 Engine
30 Throttle lever
44 Fuel injection pump
50 Particulate filter serving as filter means
53 Oxidation catalyst
54 Filter main body
68 Pressure sensor serving as clogging detecting means
80 Controller serving as control means
87 Electronic governor
88 Engine rotary sensor
89 Rack position sensor
101 Actuation portion hydraulic pump serving as hydraulic load mechanism
104 Pressure control valve
106 Switching solenoid valve

BEST MODE FOR CARRYING OUT THE INVENTION

A description will be given below of embodiments obtained by embodying the present invention on the basis of the accompanying drawings (FIGS. 1 to 11) in the case where the present invention is applied to an engine of a tractor. In this case, an illustration of a cabin is omitted in FIG. 2 for the purpose of the convenience.

(1) Outline of Tractor

Figure 2:
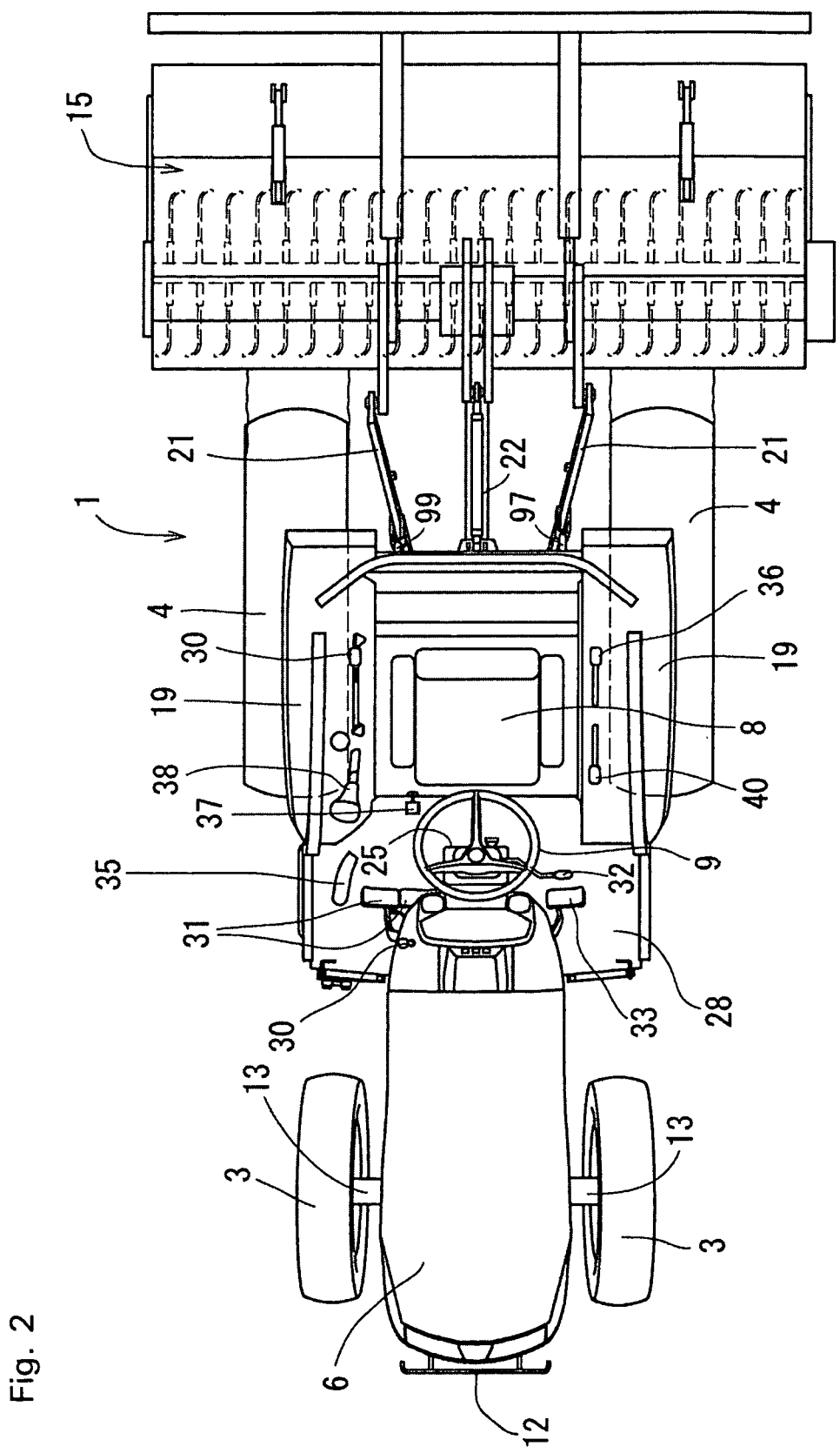
FIG. 2 is a plan view of the tractor.

First of all, a description will be given of an outline of a tractor 1 with reference to FIGS. 1 and 2.

A travel machine body 2 of the tractor 1 in accordance with a first embodiment is supported by a pair of right and left front tire wheels 3 serving as a travel portion, and a pair of right and left rear tire wheels 4 serving as the same. The tractor 1 travels forward and backward by driving the rear tire wheels 4 and the front tire wheels 3 by a diesel engine 5 mounted on a front portion of the travel machine body 2. The engine 5 is covered by a hood 6. A lower face side of the engine 5 is provided with an oil pan mechanism 10 for reserving a lubricating oil lubricating a crank shaft (not shown) or the like within the engine 5.

A cabin 7 is installed in an upper face of the travel machine body 2, and a control seat 8, and a control steering wheel (a round steering wheel) 9 moving a steering direction of the front tire wheels 3 to the right and the left by steering are arranged in an inner portion of the cabin 7. A lower side of a bottom portion of the cabin 7 is provided with a fuel tank 11 supplying a fuel to the engine 5.

The control steering wheel 9 within the cabin 7 is provided on a steering column 25 provided in a rising manner in front of the control seat 8. In a right side of the steering column 25, there are arranged a throttle lever 30 setting and retaining an output rotating speed of the engine 5, and a pair of right and left brake pedals 31 for controlling so as to brake the travel machine body 2. In a left side of the steering column 25, there are arranged a forward and backward movement switching lever 32 for controlling so as to switch a moving direction of the travel machine body 2 to the forward movement and the backward movement, and a clutch pedal 33 for actuating so as to disconnect a main clutch (not shown). In a back face side of the steering column 25, there is arranged a parking brake lever 34 for retaining the right and left brake pedals 31 at a step-on position.

In a right side of the steering column 25 in a floor panel 28 within the cabin 7, there is arranged an accelerator pedal 35 for accelerating and decelerating the engine rotating speed in a range equal to or higher than a minimum rotating speed, the minimum rotating speed corresponding to an engine rotating speed set by the throttle lever 30.

In a left side of the control seat 8, there are arranged an auxiliary shift lever 40 for switching an output range from a transmission case 17 mentioned below to a low speed and a high speed, and a PTO shift lever 36 for controlling so as to switch a drive speed of a PTO shaft 23 mentioned below. In a right side of the control seat 8, there are arranged a main shift lever 38 for a shift control, and an actuation portion position lever 39 for manually changing and controlling a height position of a rotary power tiller 15 mentioned below. Below the control seat 8, there is arranged a differential lock pedal 37 for executing an operation of rotationally driving the right and left rear tire wheels 4 at a constant speed.

On the other hand, the travel machine body 2 is constructed by an engine frame 14 having a front bumper 12 and a front axle case 13, and right and left machine body frames 16 detachably fixed to a rear portion of the engine frame 14 by a bolt. In a rear portion of the machine body frame 16, there is mounted a transmission case 17 which appropriately shifting a rotary power from the engine 5 so as to transmit to four front and rear tire wheels 3, 3, 4 and 4. The rear tire wheels 4 are attached to the transmission case 17 via a rear axle case 18 which is installed so as to protrude outward from an outer side surface of the transmission case 17. The above of the right and left rear tire wheels 4 is covered by a fender 19 fixed to the machine body frame 16.

A hydraulic type elevating mechanism 20 for elevating the rotary power tiller 15 serving as an actuation portion is detachably mounted to an upper face of a rear portion of the transmission case 17. The rotary power tiller 15 is coupled to the rear portion of the transmission case 17 via a three-point link mechanism constructed by a pair of right and left lower links 21 and a top link 22. A PTO shaft 23 for transmitting a PTO driving force to the rotary power tiller 15 is provided in a rear side face of the transmission case 17 so as to protrude backward.

A pair of right and left lift arms 96 which can be rotated up and down by a single acting type elevation control hydraulic cylinder 95 (refer to FIG. 4) are installed in the hydraulic type elevating mechanism 20. The lower link 21 and the lift arm 96 in a left side in the direction of the moving direction are coupled via a left lift rod 97. The lower link 21 and the lift arm 96 in a right side in the direction of the moving direction are coupled via a double acting type slope control hydraulic cylinder 98 serving as the right lift rod and a piston rod 99 thereof.

(2) Engine and Its Peripheral Structure

Figure 3:
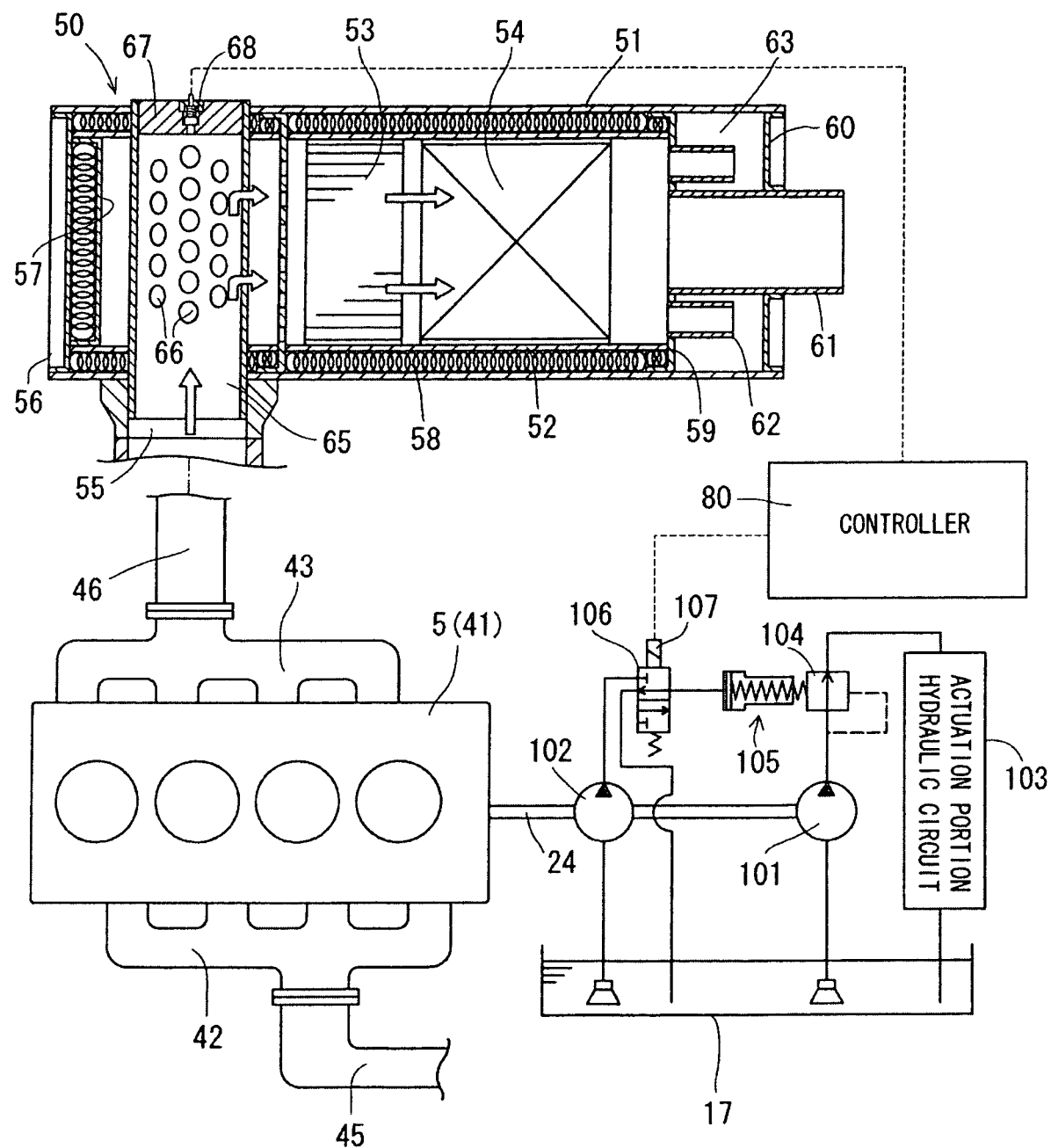
FIG. 3 is a function block diagram showing a relationship between an engine and an exhaust gas purifier.

Next, a description will be given of an engine and its peripheral structure with reference to FIGS. 3 to 5.

The engine 5 of the tractor 1 in accordance with the first embodiment is provided with a cylinder block (not shown) in which a cylinder head 41 is fastened to an upper face thereof, and the oil pan mechanism 10 for reserving the lubricating oil is fastened to a lower face of the cylinder block. An intake manifold 42 is connected to one side face of the cylinder head 41, and an exhaust manifold 43 is connected to the other side face. A fuel injection pump 44 (refer to FIG. 6) for feeding a fuel into each of combustion chambers (auxiliary chambers) of the engine 5 is provided below the intake manifold 42 in a side face of the cylinder block. Though details are not illustrated, an air cleaner is attached to a leading end side of the intake manifold 42 via an intake pipe 45.

In this case, an air which is temporarily filtered by the air cleaner is introduced into each of the cylinders (into the cylinders in an intake stroke) of the engine 5 via the intake pipe 45 and the intake manifold 42. Further, an expansion stroke going with a self ignition combustion of an air-fuel mixture is carried out in each of the combustion chambers, by pressure feeding the fuel sucked from the fuel tank 11 into each of the combustion chambers (auxiliary chambers) by the fuel injection pump 44, at a time when the compression stroke in each of the cylinders is completed.

A particulate filter 50 (hereinafter, referred to filter) corresponding to one example of filter means is connected to a leading end side of the exhaust manifold 43 via an exhaust pipe 46. The exhaust gas discharged from each of the cylinders to the exhaust manifold 43 in an exhaust stroke after the expansion stroke is discharged to an outer portion after being purified via the exhaust pipe 46 and the filter 50.

The filter 50 is provided for collecting a particulate matter (hereinafter, referred to as PM) in the exhaust gas. The filter 50 in accordance with the first embodiment is structured such that an oxidation catalyst 53, for example, a platinum or the like and a filter main body 54 are lined up in series so as to be accommodated in an approximately tubular filter case 52 existing within a casing 51 made of a heat resisting metal material.

The intake manifold 42 and the intake pipe 45 correspond to the intake path of the engine 5, and the exhaust manifold 43 and the exhaust pipe 46 correspond to the exhaust path of the engine 5. In the first embodiment, the oxidation catalyst 53 is arranged in an exhaust gas upstream side within the filter case 52, and a filter main body 54 is arranged in an exhaust gas downstream side. The filter main body 54 is formed as a honeycomb construction having a lot of cells which are comparted by a porous (filterable) partition wall.

An exhaust gas introduction port 55 communicating with the exhaust pipe 46 is provided in one side portion of the casing 51. One end portion of the casing 51 is closed by a first bottom plate 56, and one end portion facing to the first bottom plate 56 in the filter case 52 is closed by a second bottom plate 57. A heating insulating material 58 such as a glass wool is filled in an annular gap between the casing 51 and the filter case 52 and a gap between both the bottom plates 56 and 57 in such a manner as to surround a periphery of the oxidation catalyst 53 and the filter main body 54.

The other side portion of the casing 51 is closed by two lid plates 59 and 60, and an approximately tubular type exhaust gas discharge port 61 passes through both the lid plates 59 and 60. Further, a resonant chamber 63 communicating with the filter case 52 via a plurality of communication pipes 62 is formed between both the lid plates 59 and 60.

An exhaust gas introduction pipe 65 is inserted to the exhaust gas introduction port 55 formed in one side portion of the casing 51. A leading end of the exhaust gas introduction pipe 65 protrudes to a side surface in an opposite side to the exhaust gas introduction port 55 while crossing over the casing 51. A plurality of communication holes 66 which are open toward the filter case 52 are formed in an outer peripheral surface of the exhaust gas introduction pipe 65. A portion of the exhaust gas introduction pipe 65 protruding to a side face in an opposite side to the exhaust gas introduction port 55 is closed by a lid body 67 which is detachably attached by screw thereto.

The lid body 67 is provided with a pressure sensor 68 as one example of the clogging detecting means detecting a clogged state of the filter main body 54. The pressure sensor 68 may employ a well-known construction, for example, utilizing a piezo resistance effect. In this case, a pressure Ps (reference pressure value) in an upstream side of the filter 50 at a time when the PM is not deposited on the filter main body 54 (at a time when the filter 50 is new) is previously stored in an ROM 82 of a controller 80 mentioned below or the like, a present pressure P at the same measuring position is detected by the pressure sensor 68, a difference $\Delta P$ between the reference pressure value Ps and the detection value P of the pressure sensor 68 is determined, and a PM deposition amount of the filter main body 54 is converted (estimated) on the basis of the pressure difference $\Delta P$ (refer to FIG. 8).

In this case, the structure may be made such that the pressure sensors are arranged in the upstream and downstream sides of the filter 50 in the exhaust path of the engine 5, and the PM deposition amount of the filter main body 54 is converted (estimated) on the basis of a difference between both the detected values.

In the structure mentioned above, the exhaust gas from the engine 5 enters into the exhaust gas introduction pipe 65 via the exhaust gas introduction port 55, is jetted out into the filter case 52 from each of the communication holes 66 formed in the exhaust gas introduction pipe 65, is dispersed to a wide region within the filter case 52, and thereafter passes through the oxidation catalyst 53 and the filter main body 54 in this order so as to be purified. The PM in the exhaust gas can not pass through the porous partition wall between the cells in the filter main body 54 in this stage and is collected. Thereafter, the exhaust gas passing through the oxidation catalyst 53 and the filter main body 54 is discharged from the exhaust gas discharge port 61.

If the exhaust gas temperature is over a regenerable temperature (for example, about 300° C.) at a time when the exhaust gas passes through the oxidation catalyst 53 and the filter main body 54, a nitrogen monoxide (NO) in the exhaust gas is oxidized into an unstable nitrogen dioxide ($NO_2$) by an action of the oxidation catalyst 53. Further, since the PM deposited on the filter main body 54 is oxidized and removed by an oxygen (O) which is discharged at a time when $NO_2$ comes back to NO, the PM collecting capacity of the filter main body 54 is recovered (the filter main body 54 is regenerated).

In this case, one side face of the engine 5 is provided with an actuation portion hydraulic pump 101 and a pilot pump 102 which are driven by a rotary power of the output shaft 24 in the engine 5, as one example of a hydraulic load mechanism. The actuation portion hydraulic pump 101 supplies a hydraulic fluid to the elevation control hydraulic cylinder 95 and the slope control hydraulic cylinder 98 which are within the hydraulic type elevating mechanism 20. The pilot pump 102 applies a pilot pressure to a switching solenoid valve 106 mentioned below.

The output shaft 24 protruding from the engine 5 passes through both the pumps 101 and 102, and both the pumps 101 and 102 are driven by the rotation of the output shaft 24. In other words, the rotating shaft (the output shaft 24) driving both the pumps 101 and 102 comes to a common one shaft.

A suction side of the actuation portion hydraulic pump 101 is connected to the transmission case 17 serving as a hydraulic fluid tank. A discharge side of the actuation portion hydraulic pump 101 is connected to an actuation portion hydraulic circuit 103 via a pressure control valve 104 with a back pressure mechanism 105 mentioned below. A suction side of the pilot pump 102 is connected to the transmission case 17 serving as the hydraulic fluid tank. A discharge side of the pilot pump 102 is connected to a pump side first port 106a of the switching solenoid valve 106.

The pressure control valve 104 is provided for retaining a pressure and a flow rate in the actuation portion hydraulic circuit 103 side, and switching the pressure in the actuation portion hydraulic pump 101 side between two stages, and is structured such as to be driven by an elastic force of a spring 105c via a piston 105b in the back pressure mechanism 105 so as to be switched between a normal state in which a pressure rise is not generated in the actuation portion hydraulic pump 101 side, and a high pressure state in which the pressure in the actuation portion hydraulic pump 101 side is increased only at a predetermined pressure.

The switching solenoid valve 106 is of a three-port two-position switching type that the pilot pressure from the pilot pump 102 is applied to the back pressure mechanism 105 of the pressure control valve 104, and is driven by an excitation of an electromagnetic solenoid 107 on the basis of control information from a controller 80 mentioned below so as to be switched between a pilot pressure application state to a back pressure chamber 105a of the back pressure mechanism 105, and a pilot pressure discharge state from the back pressure chamber 105a.

As mentioned above, the pump side first port 106a of the switching solenoid valve 106 is connected to a discharge side of the pilot pump 102. A pump side second port 106b of the switching solenoid valve 106 is connected to the transmission case 17 serving as the hydraulic fluid tank. A back pressure side port 106c of the switching solenoid valve 106 is connected to the back pressure chamber 105a of the back pressure mechanism 105.

If the switching solenoid valve 106 is driven so as to be switched to the pilot pressure application state, the hydraulic fluid flows into the back pressure chamber 105a of the back pressure mechanism 105 from the pilot pump 102 via the switching solenoid valve 106 so as to compress the spring 105c via the piston 105b, thereby driving so as to switch to the high pressure state in which the pressure control valve 104 increases the pressure in the actuation portion hydraulic pump 101 side only at the predetermined pressure.

Accordingly, the discharge pressure (an actuation amount or a load) of the actuation portion hydraulic pump 101 is increased on the basis of an operation of the pressure control valve 104, whereby the engine load is increased. As a result, an engine output (a fuel injection amount) is increased for maintaining the set rotating speed by the throttle lever 30, and the exhaust gas temperature rises.

If the switching solenoid valve 106 is driven so as to be switched to the pilot pressure discharge state, the hydraulic fluid flows out of the back pressure chamber 105a of the back pressure mechanism 105, and the spring 105c is elongated by its own elastic restoring force, whereby the discharge pressure of the actuation portion hydraulic pump 101 is lowered to a normal state on the basis of the operation of the pressure control valve 104, and the engine load is lowered.

In this case, since the hydraulic fluid at a pressure and a flow rate which are approximately the same as those of the case where the pressure control valve 104 is not provided, is supplied to the actuation portion hydraulic circuit 103 side, an influence to the actuation portion hydraulic circuit 103 caused by the presence of the pressure control valve 104 is kept to a minimum.

A combination of the pressure control valve 104 and the switching solenoid valve 106 corresponds to a forced actuation valve means described in claims. In this case, the switching solenoid valve 106 comes to a pilot pressure discharge state generally (at a time when the control information from the controller 80 is not provided), for smoothly circulating and supplying the hydraulic fluid between the actuation portion hydraulic pump 101 and the actuation portion hydraulic circuit 103. Accordingly, the pressure control valve 104 comes to a normal state in which the pressure rise is not generated in the actuation portion hydraulic pump 101 side, normally.

Figure 4:
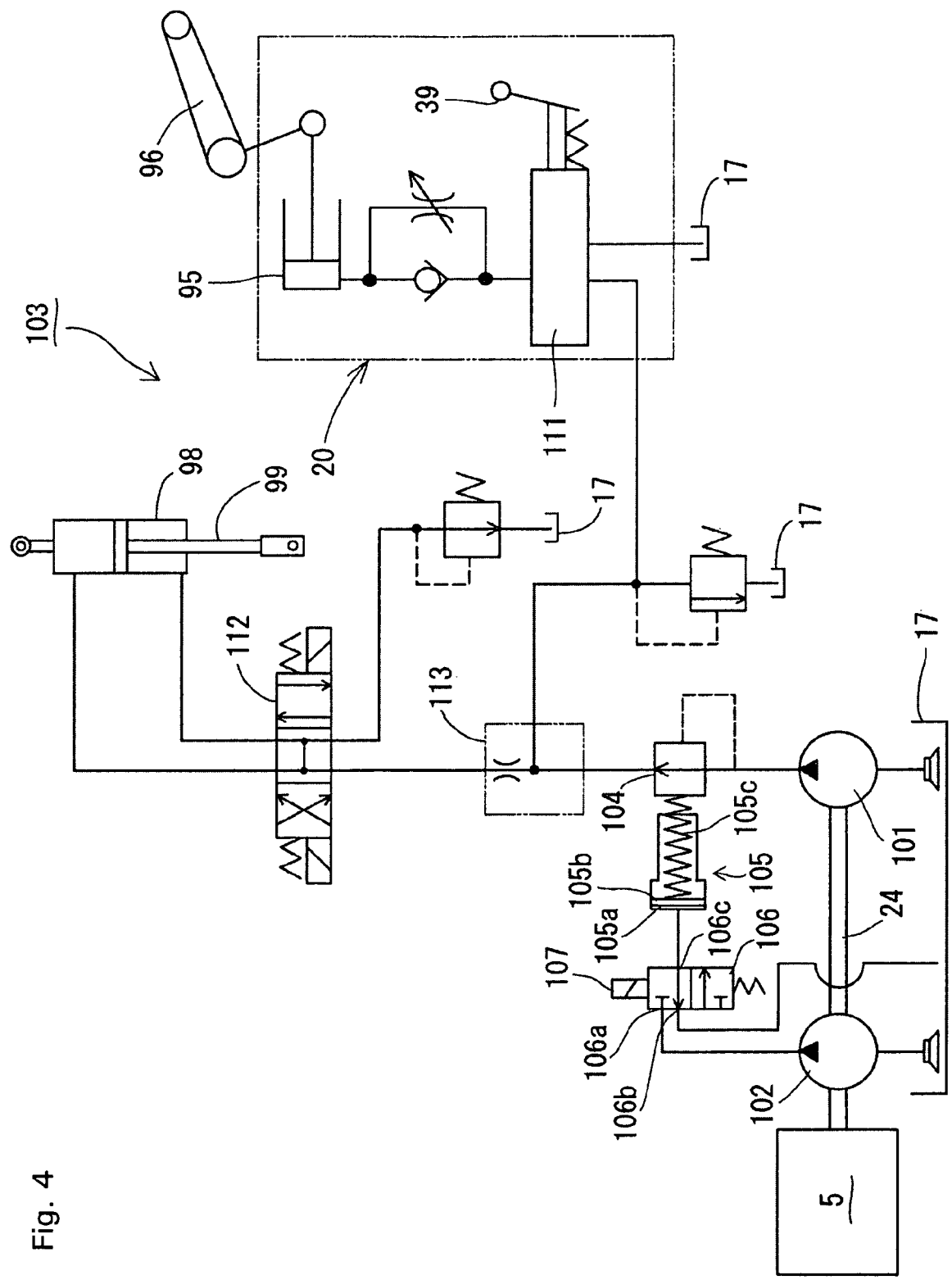
FIG. 4 is a hydraulic circuit diagram of an actuation portion of the tractor.
Figure 5:
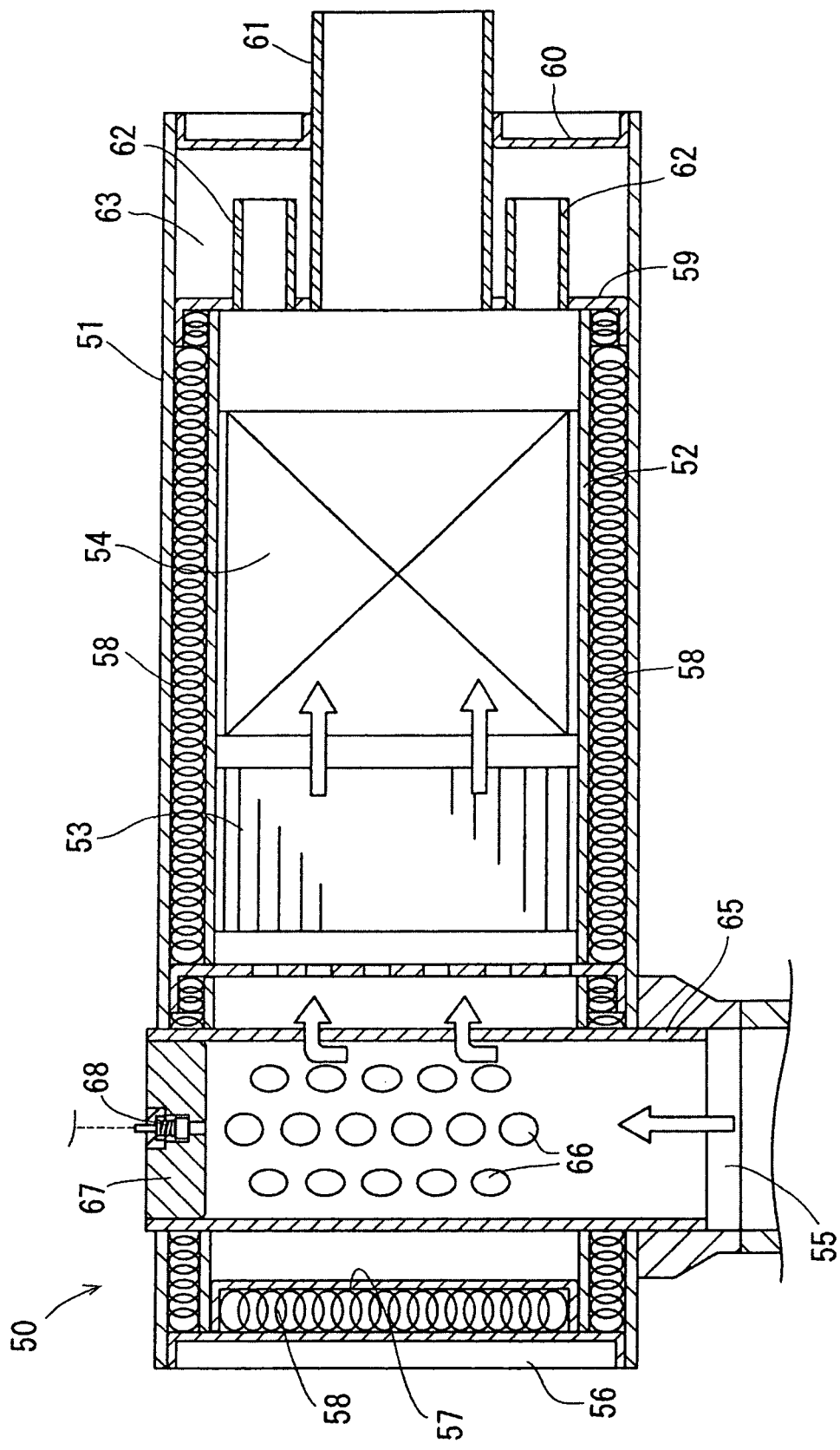
FIG. 5 is an enlarged side elevational cross sectional view of a particulate filter.

As shown in FIG. 4 in detail, the actuation portion hydraulic circuit 103 is provided with the single acting type elevation control hydraulic cylinder 95 and the double acting type slope control hydraulic cylinder 98, and the actuation portion hydraulic pump 101 is connected to an elevating hydraulic switching valve 111 for controlling a supply of the hydraulic fluid to the elevation control hydraulic cylinder 95, and a slope control solenoid valve 112 for controlling so as to supply the hydraulic fluid to the slope control hydraulic cylinder 98 via a flow dividing valve 113.

The elevating hydraulic switching valve 111 is switch operable on the basis of a manual operation of the actuation portion position lever 39. The slope control solenoid valve 112 is automatically switch operated on the basis of a drive of the electromagnetic solenoid corresponding to detection information of a rolling sensor (not shown) and an actuation portion position sensor (not shown) which are arranged on the upper face of the hydraulic type elevating mechanism 20.

If the elevating hydraulic switch valve 111 is switch operated on the basis of the manual operation of the actuation portion position lever 39, the elevation control hydraulic cylinder 95 is driven so as to expand and contract, and moves up and down and rotates the right and left lift arms 96. As a result, the rotary power tiller 15 is moved up and down via the right and left lower links 21.

Further, if the slope control solenoid valve 112 is automatically switch operated on the basis of the detection information of the rolling sensor and the working machine position sensor, the slope control hydraulic cylinder 98 is driven so as to expand and contract, and the length of the piston rod 99 is changed. As a result, the rotary power tiller 15 is inclined right and left via the right and left lower links 21. In this case, the actuation portion hydraulic circuit 103 is provided with a relief valve, a flow rate control valve, a check valve and the like (refer to FIG. 4).

(3) Structure for Executing Filter Regeneration Control

Figure 6:
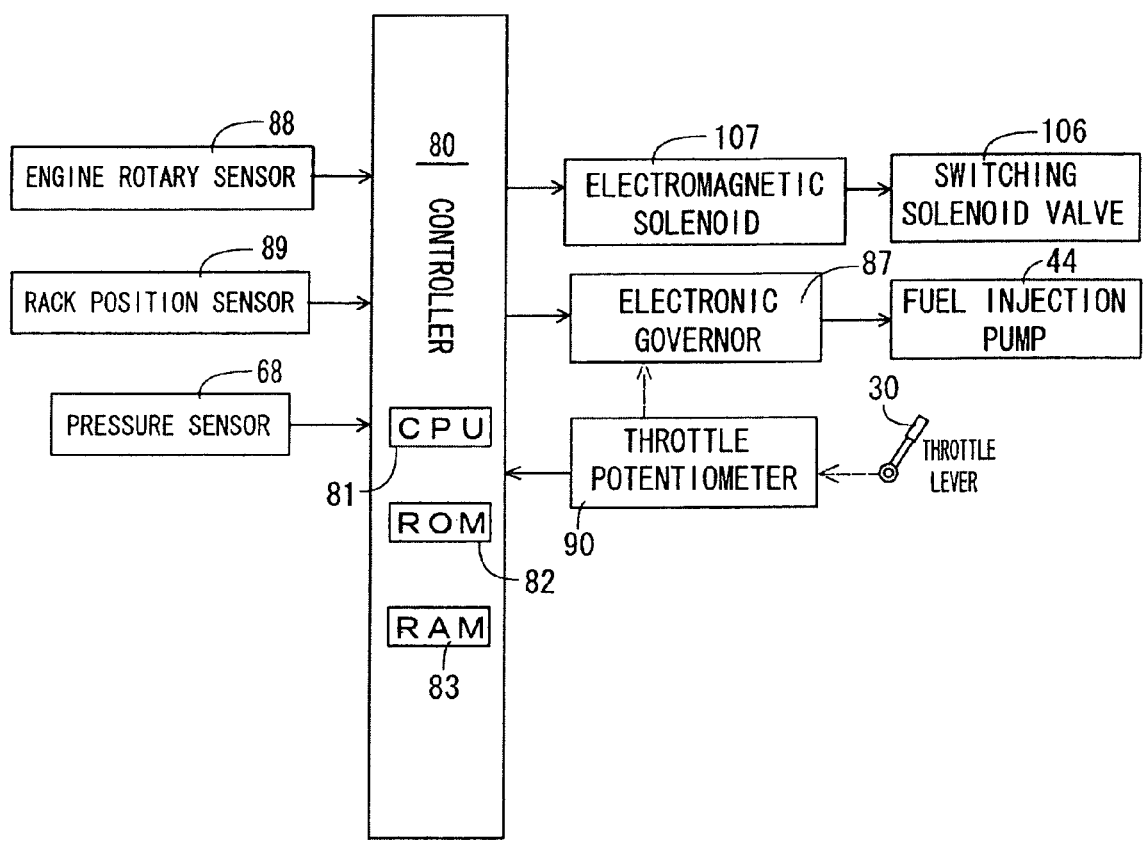
FIG. 6 is a function block diagram of an electronic governor controller.

Next, a description will be given of a structure for executing a filter regeneration control with reference to FIGS. 3, 6 and 7.

The controller 80 serving as the control means mounted on the tractor 1 executes a filter regeneration control increasing an engine load L by increasing a discharge pressure of the actuation portion hydraulic pump 101 with a pressure control of the pressure control valve 104 on the basis of the detection information of the pressure sensor 68, and is provided with an ROM 82 for storing a control program and data, an RAM 83 for temporarily storing the control program and data, an input and output interface and the like, in addition to the CPU 81 executing the various computing process and the control.

To the controller 80, there are connected an electronic governor 87 provided in the fuel injection pump 44 serving as the fuel supply apparatus, an engine rotary sensor 88 serving as rotating speed detecting means detecting the engine rotating speed, a rack position sensor 89 serving as load detecting means detecting a fuel injection amount from a rack position of the fuel injection pump 44, a throttle potentiometer 90 detecting a control position of the throttle lever 30, a pressure sensor 68 serving as clogging detecting means, and an electromagnetic solenoid 107 controlling a drive of the switching solenoid valve 106.

If the throttle lever 30 is manually operated, the controller 80 drives an electromagnetic solenoid (not shown) for driving the rack on the basis of the detection information of the throttle potentiometer 90 in such a manner that the engine rotating speed R comes to a set rotating speed by the throttle lever 30, and controls the rack position of the fuel injection pump 44. Accordingly, the engine rotating speed R is retained at a value corresponding to the position of the throttle lever 30.

(4) Description of Filter Regeneration Control

Next, a description will be given of an example of the filter regeneration control with reference to FIGS. 7 and 8. In this case, a reference load rate, that is, reference load Ls (a reference load value) corresponding to a trigger for actuating the pressure control valve 104 is assumed to be previously set by being stored in the ROM 82 or the like of the controller 80. In this case, the load rate of the engine 5 is obtained by calculating a rate of the engine load L during the work on the assumption that the maximum engine load L detected by the rack position sensor 89 is set to 100%, and the load rate of an idling state comes to 0 (zero).

Figure 7:
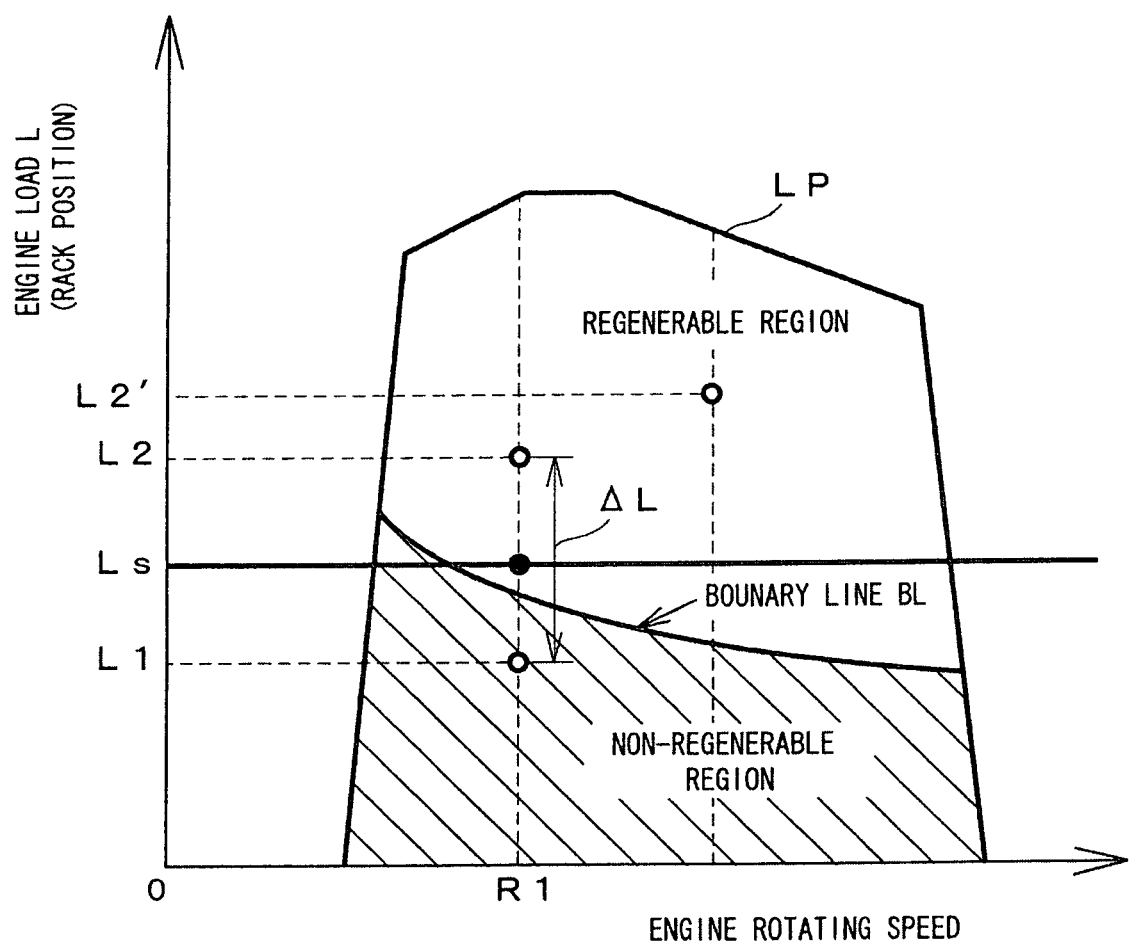
FIG. 7 is an explanatory view showing a relationship between an engine load and an engine rotating speed.
Figure 8:
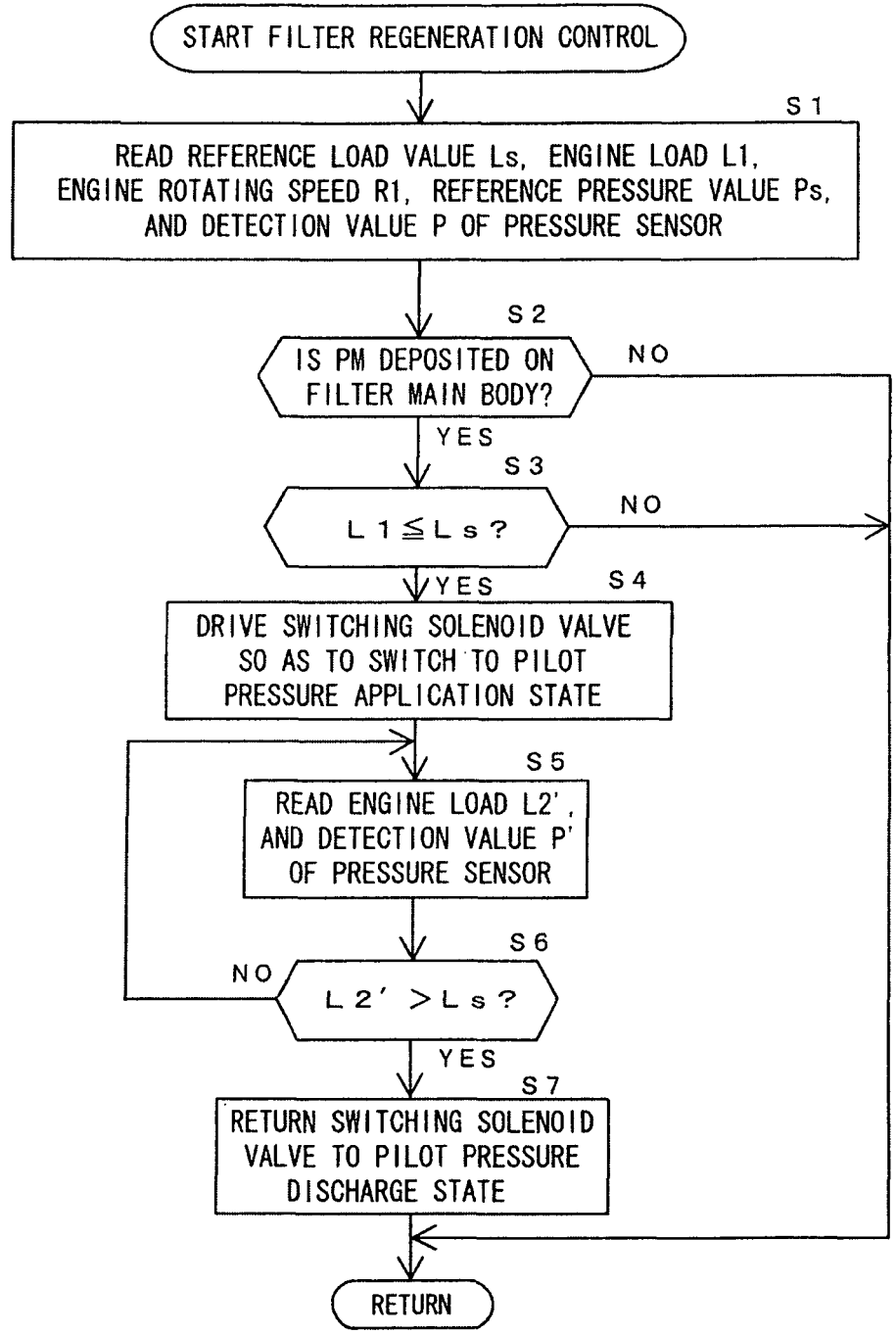
FIG. 8 is a flow chart of a filter regeneration control.

An explanatory view shown in FIG. 7 is a view of a load pattern LP expressing a relationship between the engine rotating speed R and the engine load L (which may be called as the rack position) at a time of driving the engine 5 in accordance with the first embodiment. In FIG. 7, the engine rotating speed R is set to a horizontal axis, and the engine load L in a correlation with the rack position is set to a vertical axis. In this case, a reference load value Ls is expressed by a horizontal line L=Ls.

The load pattern LP in accordance with the first embodiment is a region surrounded by an upward convex line, and is segmented up and down by a boundary line BL expressing a relationship between the engine rotating speed R and the engine load L in the case where the exhaust gas temperature is a regenerable temperature (for example, about 300° C.). An upper region with respect to the boundary line BL is a regenerable region which can oxidize and remove the PM deposited on the filter main body 54 (to which the oxidizing action by the oxidation catalyst 53 is applied), and a lower region is a non-regenerable region in which the PM is deposited on the filter main body 54 without being oxidized and removed.

A description will be given of a flow of a filter regeneration control by using a flow chart shown in FIG. 8. First of all, following to a start, the step reads a reference load value Ls which is previously stored in the ROM 82, a detection value (an engine load L1) of a rack position sensor 109, a detection value (an engine rotating speed R1) of the engine rotary sensor 88, a reference pressure value Ps which is previously stored in the ROM 82, and a detection value P of the pressure sensor 68 (a step S1), and determines on the basis of a magnitude of the pressure difference ΔP between the reference pressure value Ps and the detection value P of the pressure sensor 68 whether or not the PM is deposited on the filter main body 54 enough to be obstacle to an engine output (a step S2).

If the PM is not deposited on the filter main body 54 (S2: NO), the step returns as it is. If the PM is deposited on the filter main body 54 (S2: YES), a distribution resistance within the filter 50 is increased so as to cause a reduction of the engine output. Accordingly, the step discriminates whether or not the engine load L1 at this time is equal to or less than the reference load value Ls (a step S3).

The engine load L1 at this time corresponds to a total of the loads, for example, demanded for driving a power steering mechanism (not shown), the hydraulic type elevating mechanism 20, the PTO shaft 23, the rear wheels 4 and the like. If the engine load L1 at this time is larger than the reference load value Ls (S3: NO), the engine load L1 at this time has a high possibility that it exists in the regenerable region, and is in a state in which it can oxidize and remove the PM deposited on the filter main body 54 (the oxidizing action by the oxidation catalyst 53 is applied). Therefore, it is not necessary to actuate the pressure control valve 104. Then, the step returns as it is.

If the engine load L1 at this time is equal to or less than the reference load value Ls (S3: YES), the engine load L1 at this time has a high possibility that it exists in the non-regenerable region, and is in a state in which the PM is deposited on the filter main body 54 without being oxidized and removed. Accordingly, the controller 80 excites the electromagnetic solenoid 107 of the switching solenoid valve 106, and drives the switching solenoid valve 106 so as to switch to a pilot pressure application state (a step S4).

Accordingly, the pressure control valve 104 drives on the basis of an actuation of the back pressure mechanism 105 so as to switch to a high pressure state in which it increases the pressure in the actuation portion hydraulic pump 101 side at a predetermined pressure, whereby a dummy load ΔL is applied to the actuation portion hydraulic pump 101, and a discharge pressure of the actuation portion hydraulic pump 101 is increased. Further, due to an increase of the discharge pressure of the actuation portion hydraulic pump 101, the engine load L1 is increased at the dummy load ΔL corresponding to the predetermined pressure beyond the boundary line BL so as to come to an engine load L2 (=L1+ΔL). In addition, an engine output (a fuel injection amount) is increased for maintaining a set rotating speed by the throttle lever 30, and an exhaust gas temperature rises.

As a result, since the exhaust gas temperature exceeds the regenerable temperature at a time when the exhaust gas passes through the oxidation catalyst 53 and the filter main body 54, NO in the exhaust gas is oxidized to the unstable $NO_2$ on the basis of the action of the oxidation catalyst 53, the PM deposited on the filter main body 54 is oxidized and removed by the oxygen (O) discharged at a time when $NO_2$ returns to NO, and the PM collecting capacity of the filter main body 54 is recovered (the filter main body 54 is regenerated).

After the switching solenoid valve 106 is driven so as to be switched to the pilot pressure application state, the step again reads a detection value (an engine load L2') of the rack position sensor 109, and a detection value P' of the pressure sensor 68 (a step S5), and discriminates whether or not the engine load L2' exceeds the reference load value Ls (a step S6).

If the engine load L2' does not exceed the reference load value Ls (S6: NO), the step goes back to the step S5 for carrying on the pressure control by the pressure control valve 104. If the engine load L2' exceeds the reference load value Ls (S6: YES), it can be said to have a high possibility that it reaches the regenerable region only by the total of the load, for example, for driving the power steering mechanism and the like, even if the dummy load ΔL does not exist. Accordingly, in order to release the increase of the discharge pressure of the actuation portion hydraulic pump 101 by the pressure control valve 104, the controller 80 drives the pressure control valve 104 so as to switch to the normal state by exciting the electromagnetic solenoid 107 of the switching solenoid valve 106 so as to return the switching solenoid valve 106 to the pilot pressure discharge state, and lowers the discharge pressure of the actuation portion hydraulic pump 101 to the original state (a step S7).

With the control mentioned above, since the exhaust gas temperature rises as a result of an increase of the engine load L obtained by increasing the discharge pressure of the actuation portion hydraulic pump 101 with the pressure control of the pressure control valve 104 on the basis of the detection information of the pressure sensor 68, it is possible to raise the exhaust gas temperature equal to or higher than the regenerable temperature so as to oxidize and remove the PM, for example, even in a state in which the engine load L1 at this time is in the non-regenerable region and the PM is deposited on the filter main body 54 without being oxidized and removed, and it is possible to securely recover the PM collecting capacity of the filter main body 54 regardless of the drive state (the state of the rotating speed and the load) of the engine 5.

Further, since the switching solenoid valve 106 and the pressure control valve 104 which control the discharge pressure of the actuation portion hydraulic pump 101 are actuated in the case where the engine load L1 is equal to or less than the reference load value Ls, the pressure control valve 104 is maintained in the normal state, for example, in a state in which the engine load L1 at this time is in the regenerable region and the PM deposited on the filter main body 54 is oxidized and removed as it is, and an excess load is not applied to the engine 5 from the actuation portion hydraulic pup 101. In other words, the filter regeneration control is not carried out. Accordingly, it is possible to efficiently execute the regeneration of the filter 50, and it is possible to inhibit a specific fuel consumption from being deteriorated together with the filter regeneration control.

Further, since the pressure control of the pressure control valve 104 is released in the case where the engine load L exceeds the reference load value Ls, an excess load is not applied to the engine 5 due to the load of the actuation portion hydraulic pump 101. Accordingly, in spite that it is possible to securely suppress an engine stall caused by the dummy load applied to the actuation portion hydraulic pump 101, it is possible to lower an energy loss so as to efficiently utilize the engine output.

(5) Other Embodiment of Peripheral Structure of Forced Actuation Valve Means

Figure 9:
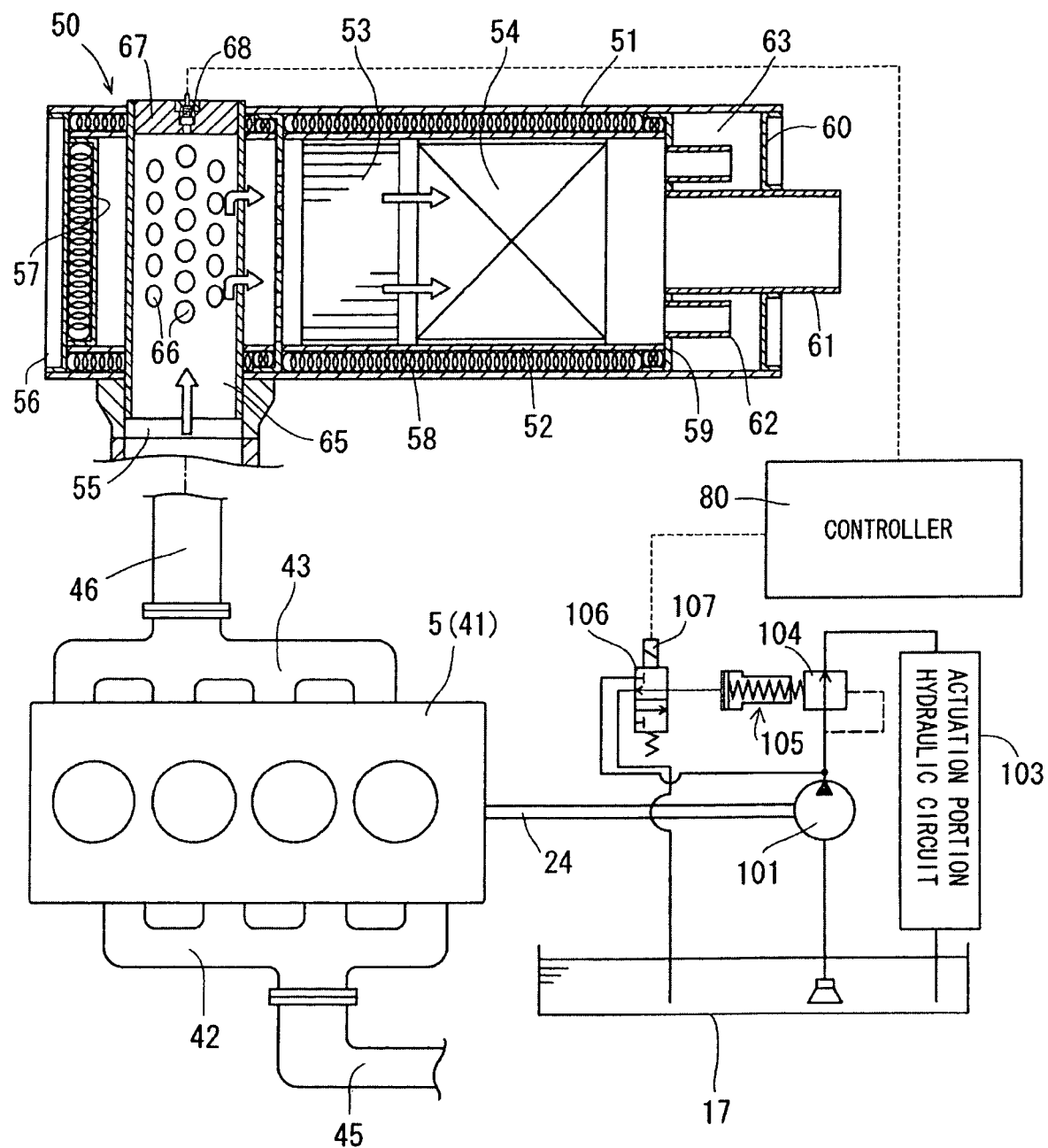
FIG. 9 is a function block diagram showing the other embodiment of a peripheral structure of forced actuation valve means.

FIG. 9 shows the other embodiment of the peripheral structure of the forced actuation valve means. This other embodiment is different from the embodiment mentioned above in a point that the pilot pump 102 in accordance with the first embodiment is not provided, and the pump side first port 106a of the switching solenoid valve 106 is connected to the discharge side of the actuation portion hydraulic pump 101. The other structures are the same as the first embodiment.

As shown in FIG. 9, it is possible to control the pressure control valve 104 on the basis of a self pressure of the hydraulic fluid discharged from the actuation portion hydraulic pump 101. In other words, the structure may be such that the discharge side of the actuation portion hydraulic pump 101 is branch connected to the pump side first port 106a of the switching solenoid valve 106, and the self pressure flows into the back pressure chamber 105a of the back pressure mechanism 105 on the basis of a switching command from the controller 80. In this case, it is possible to drive the pressure control valve 104 so as to switch (control the pressure) by setting a cross sectional area of the piston of the back pressure chamber 105a larger than a cross sectional area of the pressure control chamber of the pressure control valve 104. Since the necessary pump number can be made less than that in the case of the first embodiment by employing the structure mentioned above, the structure becomes simple and it is possible to contribute to a suppression of a manufacturing cost.

(6) Second Embodiment of Forced Actuation Valve Means

Figure 10:
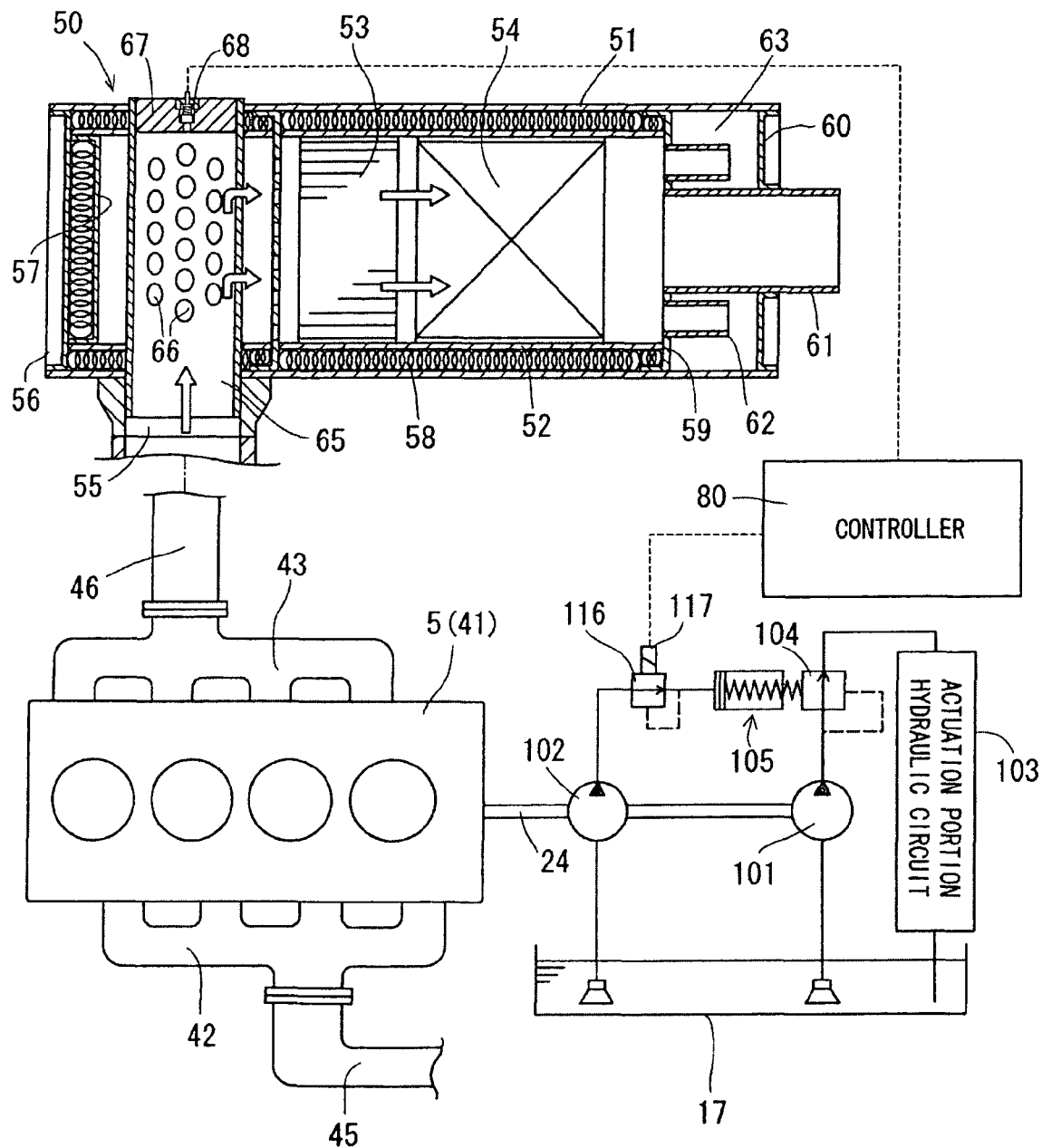
FIG. 10 is a function block diagram showing a second embodiment of the forced actuation valve means.

FIG. 10 shows a second embodiment of the forced actuation valve means. The second embodiment is different from the first embodiment in a point that the switching solenoid valve 106 of the ON and OFF control type is changed to a pilot pressure control solenoid valve 116 which can control the hydraulic fluid supply pressure to the back pressure chamber 105a.

The pilot pressure control solenoid valve 116 controls a pilot pressure applied to the back pressure chamber 105a of the back pressure mechanism 105 with an excitation of an electromagnetic solenoid 117 on the basis of the control information from the controller 80. Accordingly, the control pressure in the actuation portion hydraulic pump 101 side in the pressure control valve 104 is controlled in correspondence to the hydraulic fluid supply pressure via the pilot pressure control solenoid valve 116. The pressure close to the actuation portion hydraulic circuit 103 side in the pressure control valve 104 is maintained constant in the same manner as the first embodiment. In this case, the pilot pressure control solenoid valve 116 is set such that the pilot pressure is not applied to the pressure control valve 104 generally (in the case where the control information from the controller 80 is not generated). The other structures are the same as those of the first embodiment.

An aspect of the filter regeneration control in the other embodiment is basically the same as the first embodiment. In this case, in a step S4 in FIG. 8, the controller 80 excites the electromagnetic solenoid 117 of the pilot pressure control solenoid valve 116 so as to increase the hydraulic fluid supply pressure of the pilot pressure control solenoid valve 116, thereby making the control pressure of the pressure control valve 104 high and making the engine load L larger than the reference load value Ls.

Even in the case where the control mentioned above is employed, the same operations and effects as those of the first embodiment can be achieved. Particularly, in the second embodiment, since it is possible to optionally change the hydraulic fluid supply pressure of the pilot pressure control solenoid valve 116, it is possible to optionally control the control pressure of the pressure control valve 104, and further a rising width (the dummy load) ΔL of the engine load L. Accordingly, it is possible to achieve a high effect for suppressing a deterioration of a specific fuel consumption due to the filter regeneration control.

Figure 11:
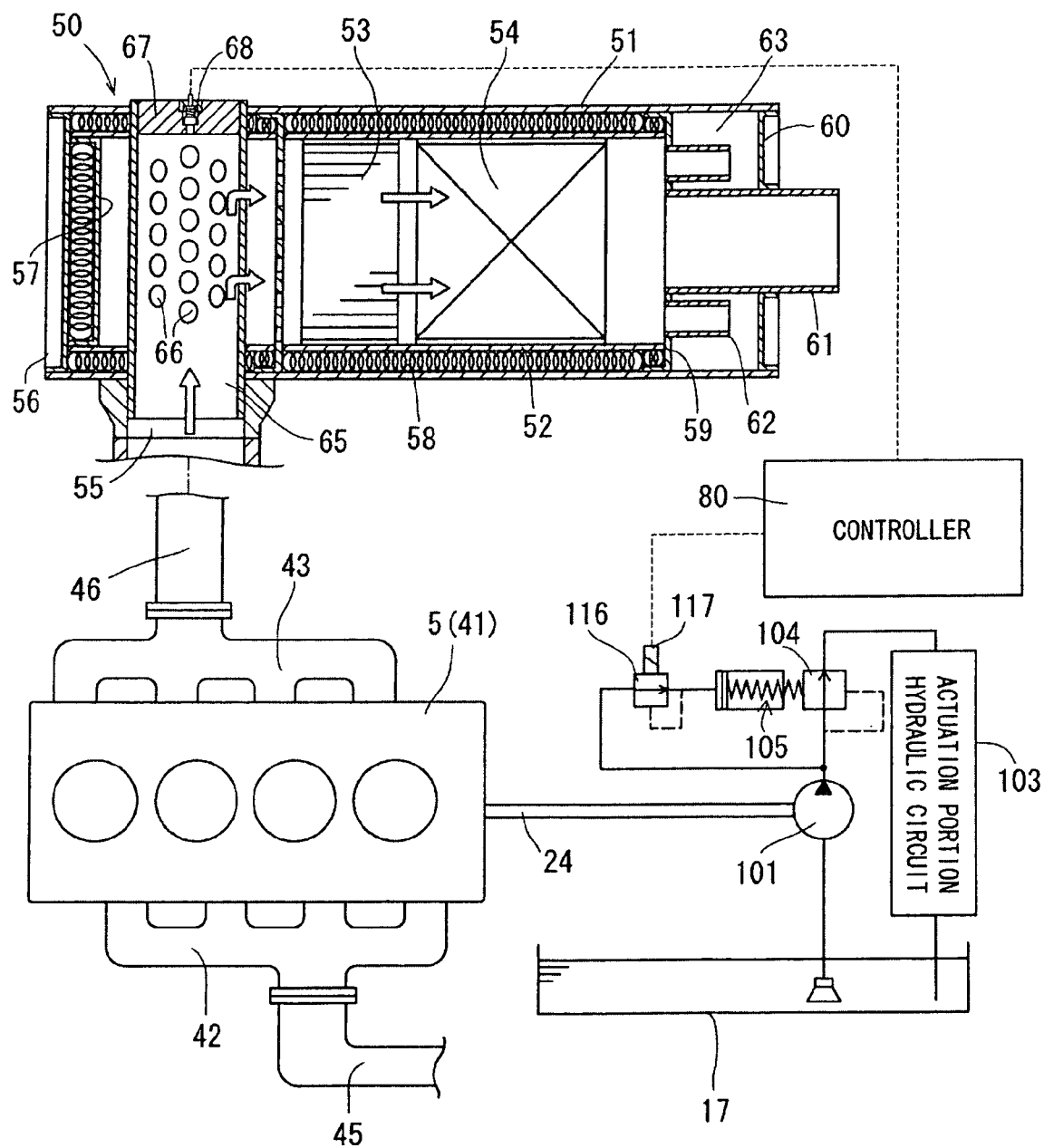
FIG. 11 is a function block diagram showing the other embodiment of a peripheral structure of the forced actuation valve means in accordance with the second embodiment.

In this case, even in the case of the second embodiment, it is possible to control the pressure control valve 104 on the basis of the self pressure of the hydraulic fluid discharged from the actuation portion hydraulic pump 101, as shown by the other embodiment in FIG. 11. In other words, the structure may be such that the discharge side of the actuation portion hydraulic pump 101 is branch connected to a suction side of the pilot pressure control solenoid valve 116, and the self pressure flows into the back pressure chamber 105a of the back pressure mechanism 105 on the basis of the switch command from the controller 80.

(7) Others

The present invention is not limited to the embodiments mentioned above, but can be variously embodied. For example, the engine to which the present invention is applied is not limited to the diesel type, but may be applied to a gas engine and a gasoline engine. Further, the present invention can be applied to an engine which is mounted on a special working vehicle, a motor vehicle, a power generator or the like, without being limited to the engine which is mounted on the farm working machine such as the tractor or the like. In addition, the structures of the portions are not limited to the illustrated embodiments, but can be variously modified within a range without departing from the spirit of the present invention.

The invention claimed is:

1. An exhaust gas purifier, comprising:
   a filter that purifies an exhaust gas arranged in an exhaust path of an engine;
   an actuation portion hydraulic pump that drives on the basis of a power of the engine;
   a sensor for detecting a clogging state of the filter; and
   a forced actuation valve that forcibly increases pressure on a first side of the actuation portion hydraulic pump;
   wherein the filter is regenerated by increasing an engine load while maintaining an engine rotating speed;
   wherein the forced actuation valve comprises a pressure control valve and a pilot pressure solenoid valve, the pressure control valve having a back pressure mechanism and being provided between the actuation portion hydraulic pump and an actuation portion hydraulic circuit located at a downstream side of the actuation portion hydraulic pump, the pilot pressure solenoid valve applying a pilot pressure to the back pressure mechanism; and
   wherein the pressure control valve maintains pressure and flow on said downstream side constant when pressure on said first side is increased, and is controlled by self-pressure of actuation fluid that flows into the back pressure mechanism from the actuation portion hydraulic pump, via the pilot pressure solenoid valve.

2. The exhaust gas purifier according to claim 1, wherein the pressure control valve actuates so as to increase the pressure at the first side only at a predetermined pressure, in the case where an engine load is equal to or less than a previously set reference load value.

3. The exhaust gas purifier according to claim 2, wherein the pressure increase at the first side by the pressure control valve is released, in the case where the engine load exceeds the reference load value.

\* \* \* \* \*